United States Patent
Pacht (10) Patent No.: US 9,670,922 B2
(45) Date of Patent: Jun. 6, 2017

(54) PUMP SYSTEM INCLUDING VALVE CARTRIDGE ASSEMBLY WITH A SUCTION VALVE IN LINE WITH A DISCHARGE VALVE

(71) Applicant: GARDNER DENVER WATER JETTING SYSTEMS, INC., Houston, TX (US)

(72) Inventor: Amos Pacht, Houston, TX (US)

(73) Assignee: GARDNER DENVER WATER JETTING SYSTEMS, INC., Houston, TX (US)

(*) Notice: Subject to any disclaimer, the term of this patent is extended or adjusted under 35 U.S.C. 154(b) by 0 days.

(21) Appl. No.: 15/054,615

(22) Filed: Feb. 26, 2016

(65) Prior Publication Data

US 2016/0177943 A1 Jun. 23, 2016

Related U.S. Application Data

(63) Continuation of application No. 14/163,872, filed on Jan. 24, 2014.

(51) Int. Cl.
| | |
|---|---|
| *E03B 5/00* | (2006.01) |
| *F04B 53/10* | (2006.01) |
| *F16K 1/42* | (2006.01) |
| *F04B 1/04* | (2006.01) |
| *F04B 53/00* | (2006.01) |

(Continued)

(52) U.S. Cl.
CPC ........ *F04B 53/1087* (2013.01); *F04B 1/0452* (2013.01); *F04B 1/124* (2013.01); *F04B 1/143* (2013.01); *F04B 1/145* (2013.01); *F04B 53/007* (2013.01); *F04B 53/109* (2013.01); *F04B 53/16* (2013.01); *F16K 1/42* (2013.01)

(58) Field of Classification Search
CPC ...... F04B 53/16; F04B 53/09; F04B 53/1087; F16K 27/003
USPC ........... 137/512.3, 565.15, 565.26, 594, 597, 137/601.2, 614.2, 614.21, 625.18; 417/454, 560, 567
See application file for complete search history.

(56) References Cited

U.S. PATENT DOCUMENTS

| | | | |
|---|---|---|---|
| 3,106,169 A | 10/1963 | Prosser et al. | |
| 3,309,013 A * | 3/1967 | Bauer | F04B 39/10 137/512.2 |

(Continued)

*Primary Examiner* — Reinaldo Sanchez-Medina
(74) *Attorney, Agent, or Firm* — Michael Best & Friedrich LLP (57) ABSTRACT

A pump system includes a pump housing defining a plurality of pump bores, a plurality of pumping members, and a plurality of valves positioned within the pump housing. Each of the valves includes a valve body defining a plurality of inlets, arranged to receive a low pressure fluid, a suction valve coupled to the valve body and movable between a closed position and an open position, the suction valve including a suction valve closing member having a conical contact surface having a large diameter portion, and a first elastomeric member positioned adjacent the large diameter portion, and a discharge valve coupled to the valve body and movable between a closed position and an open position, the discharge valve including a discharge valve closing member having a conical contact surface having a large diameter portion, and a second elastomeric member positioned immediately adjacent the large diameter portion.

13 Claims, 6 Drawing Sheets

(51) Int. Cl.
*F04B 1/12* (2006.01)
*F04B 1/14* (2006.01)
*F04B 53/16* (2006.01)

(56) References Cited

U.S. PATENT DOCUMENTS

| | | | |
|---|---|---|---|
| 3,370,545 A | 2/1968 | Waibel | |
| 3,702,624 A | 11/1972 | Fries | |
| 3,726,612 A | 4/1973 | Greene, Jr. | |
| 3,820,922 A * | 6/1974 | Buse et al. | F04B 1/00 417/539 |
| 4,878,815 A * | 11/1989 | Stachowiak | F04B 53/1025 137/454.4 |
| 4,924,901 A | 5/1990 | Valavaara | |
| 5,037,276 A | 8/1991 | Tremoulet, Jr. | |
| 5,064,354 A * | 11/1991 | Robertson | F04B 53/162 417/403 |
| 5,147,189 A | 9/1992 | Bamowski | |
| 5,230,363 A * | 7/1993 | Winn, Jr. | E21B 21/01 137/512.3 |
| 5,302,087 A * | 4/1994 | Pacht | F04B 53/007 417/53 |
| 5,605,449 A * | 2/1997 | Reed | F04B 53/1022 137/454.4 |
| 5,924,853 A | 7/1999 | Pacht | |
| 6,227,240 B1 * | 5/2001 | Wu | F04B 53/102 137/516.29 |
| 8,221,100 B2 | 7/2012 | Forrest et al. | |
| 8,240,634 B2 | 8/2012 | Jarchau et al. | |
| 8,454,325 B2 | 6/2013 | Fisher et al. | |
| 2002/0079383 A1 * | 6/2002 | Forrest | B05B 9/0413 239/381 |
| 2009/0194717 A1 | 8/2009 | Jarchau et al. | |
| 2010/0140526 A1 * | 6/2010 | Forrest | F16K 1/42 251/359 |

* cited by examiner

PUMP SYSTEM INCLUDING VALVE CARTRIDGE ASSEMBLY WITH A SUCTION VALVE IN LINE WITH A DISCHARGE VALVE

BACKGROUND

The disclosure concerns a valve cartridge assembly that has a valve body with an inlet valve assembly at a first end of the valve body and an outlet valve assembly at a second end of the valve body. The valve cartridge assembly can be adapted to be carried by a fluid end of a high pressure fluid pump.

SUMMARY

An embodiment of the invention includes a valve body. The valve body has a first main channel formed in a portion of said valve body. A second main channel is formed in a portion of said valve body. A plurality of inlet channels are formed in portions of said valve body. Each inlet channel has a respective first and a respective second opening; each inlet channel has a fluid pathway extending between its respective first opening and its respective second opening. Each each first opening of each inlet channel provides an entry into its respective pathway and provides an entry into the valve body. Each second opening provides an exit from its respective pathway into the first main channel. A suction valve seat delimits a first outlet. The first outlet opens into said first main channel. The suction valve seat has a continuous valve seating surface without any through channels opening therethrough. A discharge valve seat delimits a second outlet. The second outlet opens into the second main channel.

The valve body can further include a plurality of outlet channels formed in portions of said valve body. Each outlet channel has a respective first and a respective second opening. Each outlet channel has a fluid pathway extending between its respective first opening and its respective second opening. Each first opening of each outlet channel provides an entry into its respective pathway and an entry into the valve body. Each second opening provides an exit from its respective pathway into the second main channel.

A suction valve can be coupled to said valve body. The suction valve has a contact surface which contacts said suction valve seat seating surface when said suction valve is in a closed position and wherein a discharge valve is coupled to the valve body. A discharge valve can be coupled to the valve body. It has a contact surface which contacts said discharge valve seat seating surface when said discharge valve is in a closed position.

In one construction, a pump system includes a pump housing defining a plurality of pump bores, a plurality of pumping members, each pumping member disposed within one of the plurality of pump bores and reciprocal to pump a fluid, a fluid intake manifold formed as part of the pump housing and arranged to contain a quantity of fluid at a low pressure, and a fluid discharge manifold formed as part of the pump housing and arranged to contain a quantity of fluid at a high pressure. A plurality of valves is positioned within the pump housing, each of the valves including a valve body defining a plurality of inlets, each of the inlets disposed within the intake manifold to draw fluid directly therefrom, and a suction valve coupled to the valve body and movable between a closed position and an open position which facilitates the flow of low pressure fluid into one of the plurality of pump bores. Each of the valves also includes a plurality of inlet channels formed as part of the valve body to direct fluid from the plurality of inlets to the suction valve, a discharge valve coupled to the valve body and movable between a closed position and an open position which facilitates the flow of high pressure fluid into the fluid discharge manifold, and a plurality of discharge channels formed as part of the valve body and arranged to direct high pressure fluid from one of the pump bores to the discharge valve.

In another construction, a pump system includes a pump housing defining a plurality of pump bores, a plurality of pumping members, each pumping member disposed within one of the plurality of pump bores and reciprocal to pump a fluid, and a plurality of valves positioned within the pump housing. Each of the valves includes a valve body defining a plurality of inlets, each of the inlets arranged to receive a low pressure fluid, a suction valve coupled to the valve body and movable between a closed position and an open position which facilitates the flow of low pressure fluid into the valve, the suction valve including a suction valve closing member having a conical contact surface having a small diameter portion and a large diameter portion, and a first elastomeric member positioned immediately adjacent the large diameter portion, and a discharge valve coupled to the valve body and movable between a closed position and an open position which facilitates the flow of high pressure fluid out of the valve, the discharge valve including a discharge valve closing member having a conical contact surface having a small diameter portion and a large diameter portion, and a second elastomeric member positioned immediately adjacent the large diameter portion.

BRIEF DESCRIPTION OF THE DRAWINGS

FIG. 3b is an exploded and partial sectional view of the assembly of FIG. 1 wherein the valve body and discharge valve assembly O-ring have been sectioned; the section is through outlet channels in the valve body; the valve cartridge assembly has been rotated 45 degrees relative to FIG. 3a;

DETAILED DESCRIPTION

Now referring to FIGS. 1-3b, a valve cartridge assembly 15 has a valve body 17, a suction valve assembly 19 carried by the valve body 17 and a discharge valve assembly 21 carried by the valve body 17. The suction valve assembly 19 has a suction valve 23. The suction valve in the closed position closes and seals off and covers an inlet 25. The discharge assembly 21 has a discharge valve 28. The discharge valve 28 in the closed position closes and seals off and covers an outlet 29. The inlet 25 opens through a portion of the valve body 17. The outlet 29 opens through a portion of the valve body 17. The inlet 25 is called an inlet because it allows fluid to flow into the pumping chamber 31 from the suction manifold. With respect to the valve body 17, the inlet 25 can be called a first outlet or a suction outlet because this is where fluid entering the valve body 17 exits the valve body 17 into the pumping chamber 31. The outlet 29 is called an outlet because it allows fluid to exit the valve body from the pumping chamber 31. With respect to the valve body, the outlet 29 can be called a second outlet or discharge outlet because this is where fluid exits the valve body after being received into the valve body 17 from the pumping chamber 31. In general, and as explained in more detail below, during the upstroke of the pumping member 33 of the pump, fluid is drawn from the suction manifold 35 of the fluid end 34 and into the valve body 17. The fluid moves through the inlet 25 and past the suction valve 23 and into pumping fluid chamber 31 of the fluid end 34. During the down stroke, the fluid in the pumping chamber 31 moves back into the valve body 17 and passes through the outlet 29 and past the discharge valve 28. The fluid flows into the discharge manifold 37 of the fluid end 34.

Figure 1:
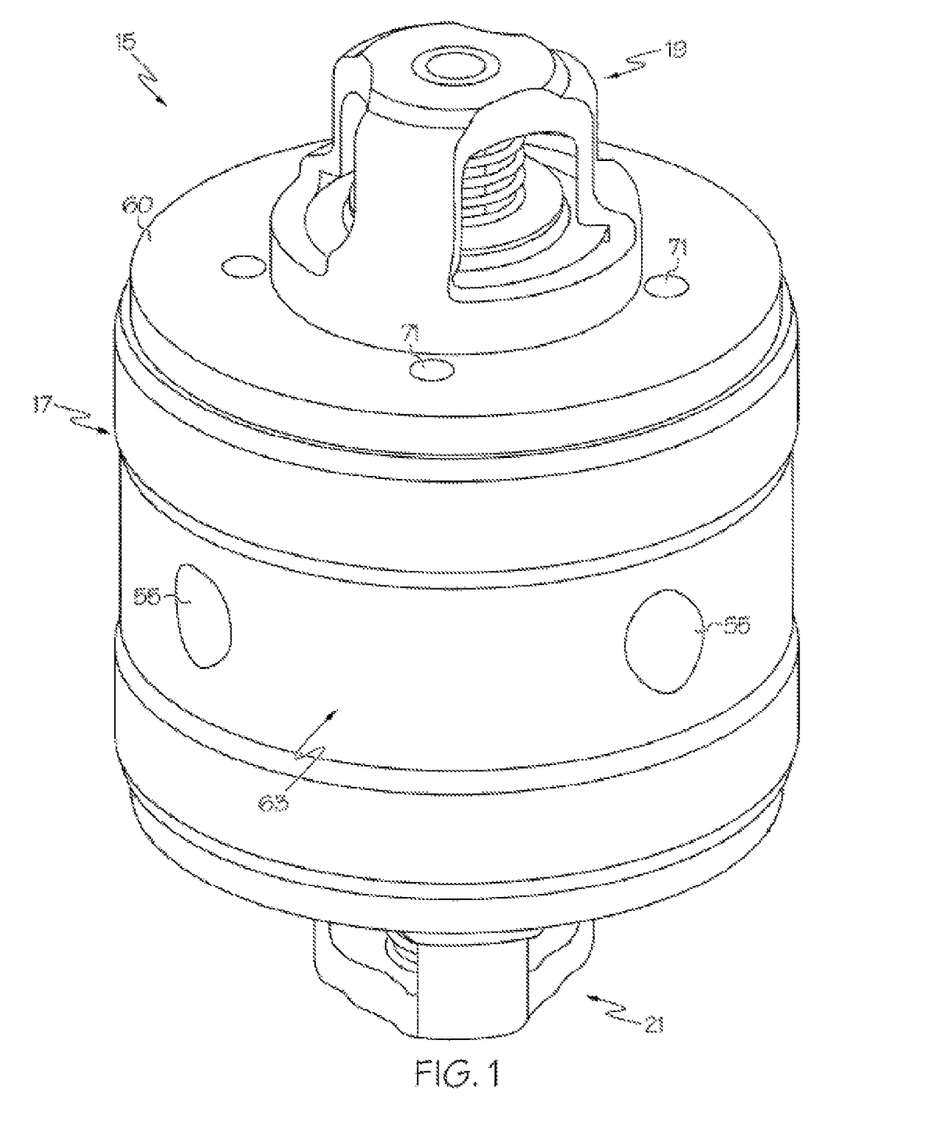
FIG. 1 is an isometric view of a valve cartridge assembly looking into a suction end of the assembly.
Figure 2A:
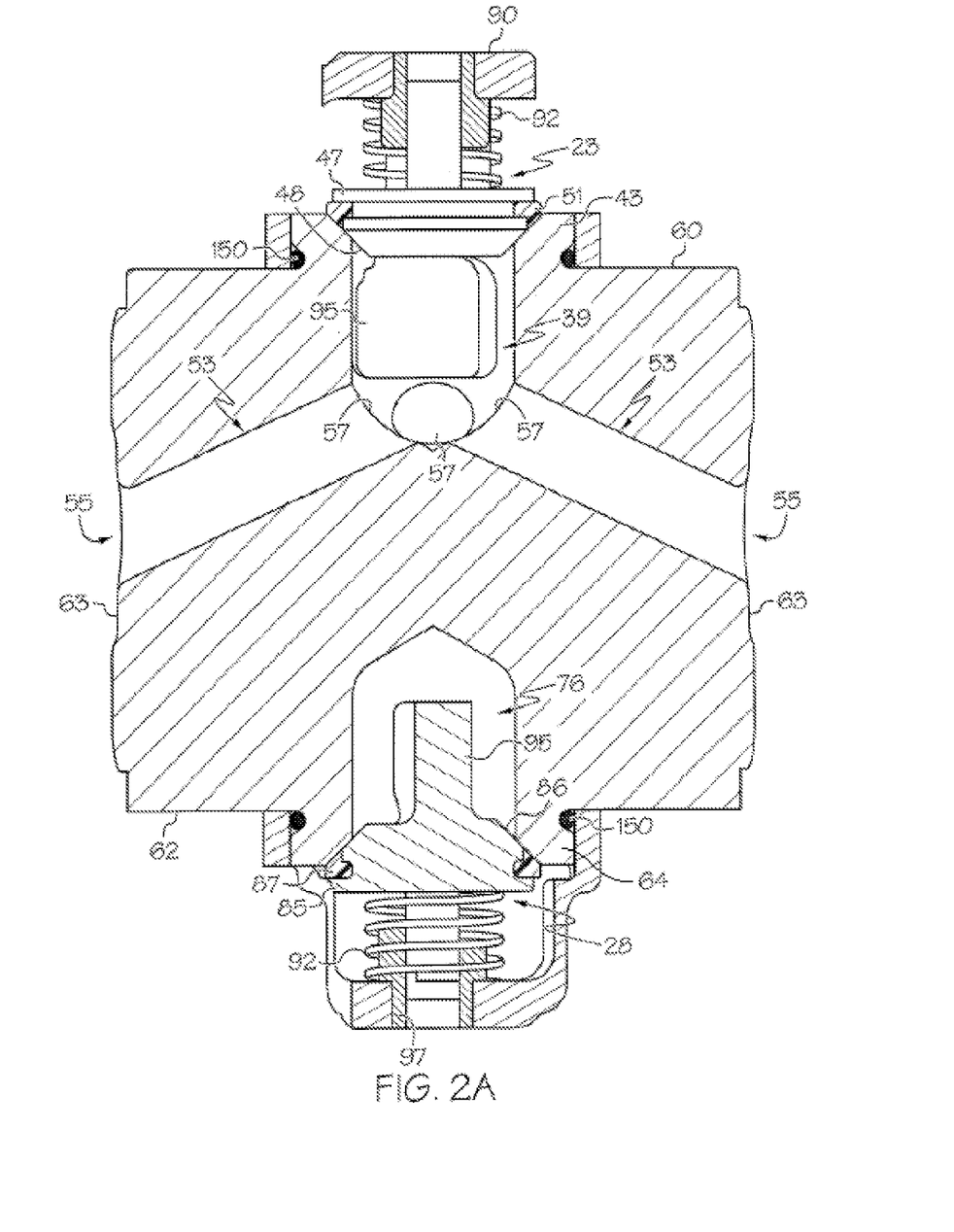
FIG. 2a is a partial sectional view of the assembly of FIG. 1 wherein the valve body and other components of the assembly have been sectioned; the section is through inlet channels in the valve body; some components, such as the suction valve, for clarity, have not been sectioned.
Figure 3A:
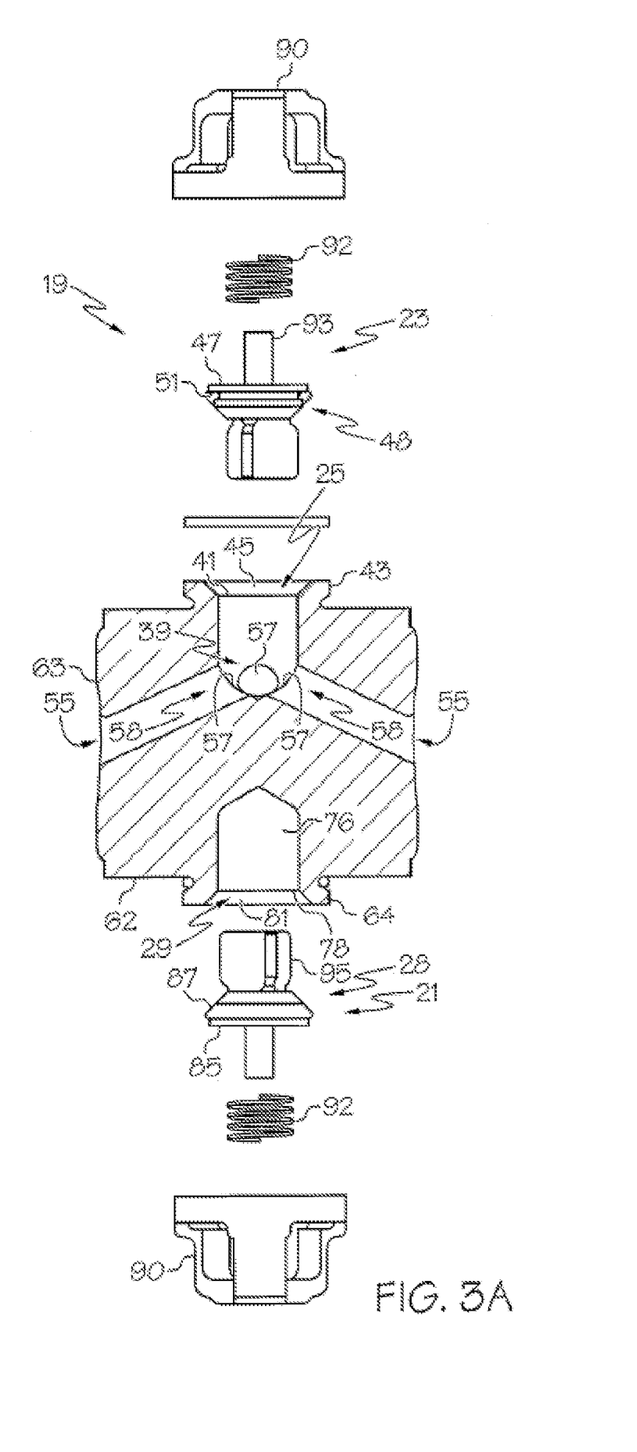
FIG. 3a is an exploded and partial sectional view of the assembly of FIG. 1 wherein the valve body, discharge valve assembly O-ring, and elastomeric member of the suction valve have been sectioned; the section is through inlet channels in the valve body.

The inlet 25 is the only inlet proximate and adjacent the suction valve 23. The inlet 25 is at a first end of a first main channel 39 and opens into the first main channel 39. The first main channel 39 is formed in a portion of the valve body 17. The inlet 25 is delimited by a surface. The surface 41 circumscribes the inlet 25. The surface is continuous. The continuous surface is smooth and without any appreciable detents or bumps. The inlet 25 is delimited and circumscribed in the radial direction, relative to the axis of the inlet, by the surface 41. The continuous surface 41 intersects and lies along a continuous path wherein the path falls completely within a single plane.

The inlet 25 is delimited by suction valve seat 43. The inlet 25 is circumscribed by the suction valve seat 43. The inlet 25 is circumscribed and delimited in the radial direction, relative to the axis of the inlet, by the suction valve seat 43. The inlet 25 is the only inlet delimited and/or circumscribed by the suction valve seat 43. The continuous surface 41 forms at least part of the suction valve seat 43. In the present embodiment the suction valve seat 43 has a seating surface 45 which is formed at least in part by the continuous surface 41. In the present example the entire valve seating surface 45 is formed by the continuous surface 41. The valve seating surface 45 is continuous and without any through channels opening therethrough. It also has no appreciable bumps or detents therein. The inlet 25 is the only inlet delimited and/or circumscribed by the suction valve seating surface 45. The suction valve seat 43 is coupled to a portion of the valve body 17, is integrally formed with the portion of the valve body 17 and seamless with the portion of valve body.

The valve seating surface 45 extends from a first axial end to a second axial end. The second axial end is proximate the first main channel 39 and delimits an area of the inlet 25 that opens to the main channel 39. The first axial end is proximate the pumping fluid chamber 31 and delimits that area of the inlet 25 which opens to the fluid chamber 31. The valve seating surface 45 is angled from the first axial end towards the axis of inlet. The axis of the inlet extends through the first axial end and the second axial end. The angle of intersection, relative to the axis of the inlet, is greater than 0 and less than 90 degrees. The surface 45 is concave.

The suction valve 23 has a valve closing member 47 with a contact surface 48. In this example the closing member 47 is a valve head. The contact surface 48 contacts the valve seating surface 45 when the suction valve is in the closed position. The contact surface 48 delimits a shape complimentary to the shape delimited by the valve seating surface 45. The contact surface 48 is continuous, smooth and without any appreciable detents or bumps. A portion 51 of the contact surface 48 which contacts valve seating surface 45 when the valve is in the closed position enhances the sealing engagement between the closing member 47 and the suction valve seat 43. The portion 51 is a different material than other portions of the contact surface that contact the valve seating surface. The portion can be a softer resilient alloy than the other contact portions. The portion can be plastic or rubber. The portion in the enclosed example is elastomeric. The portion is a continuous surface without any appreciable bumps or detents. The elastomeric material is part of a continuous elastomeric member inlaid around a portion of the closing member. It is carried by a portion of the closing member 47. The pumping member 33 in the present example is a plunger.

A plurality of inlet channels 53 is in different portions the valve body 17. Each has a respective first opening 55 and a respective second opening 57. Each channel has a fluid pathway 58 extending between its respective first 55 and respective second 57 opening. Each first opening 55 opens through different portions of a surface 63 of the valve body 17. There are four first openings 55, each spaced 90 degrees apart and around an axis of the valve body 17. The axis of the valve body 17 extends through a first 60 and second 62 surface of the valve body 17. The surface 63 is radially outward of the axis. The surface 63 delimits the valve body in the radial direction relative to the valve body axis. The surface 63 is an intermediate surface and between the first surface 60 and the second surface 62 of the valve body 17. The first 60 and second 62 surfaces are oppositely facing and opposite each other. The first surface 60 is proximate the suction valve seat 43. The suction valve seat 43 extends away from the first surface 60 in the direction of the inlet axis. It is coupled to the first surface 60 and seamless with first surface. The second surface 62 is proximate the discharge valve seat 64. The first 60 and second 62 surfaces are axially spaced and delimit axial ends of the valve body 17. Each first opening 55 opens into and is proximate a portion of a suction chamber 65 in suction manifold 35 pathway 58 and an entry into the valve body 17. Each inlet channel second opening 57 opens into and is proximate the first main channel 39. Each second opening 57 provides an exit from its pathway 58 into the first main channel 39. The main channel 39 can simply be a hollow formed by a chamber into which each second opening 57 opens. Each inlet channel 53 extends radially outwardly and axially relative to the valve body 17 axis, inlet 25 axis and first main channel 39 axis. Accept for the first main channel, the inlet channels do not intersect. The suction valve 23 is not proximate or adjacent any of these second openings 53.

Figure 2B:
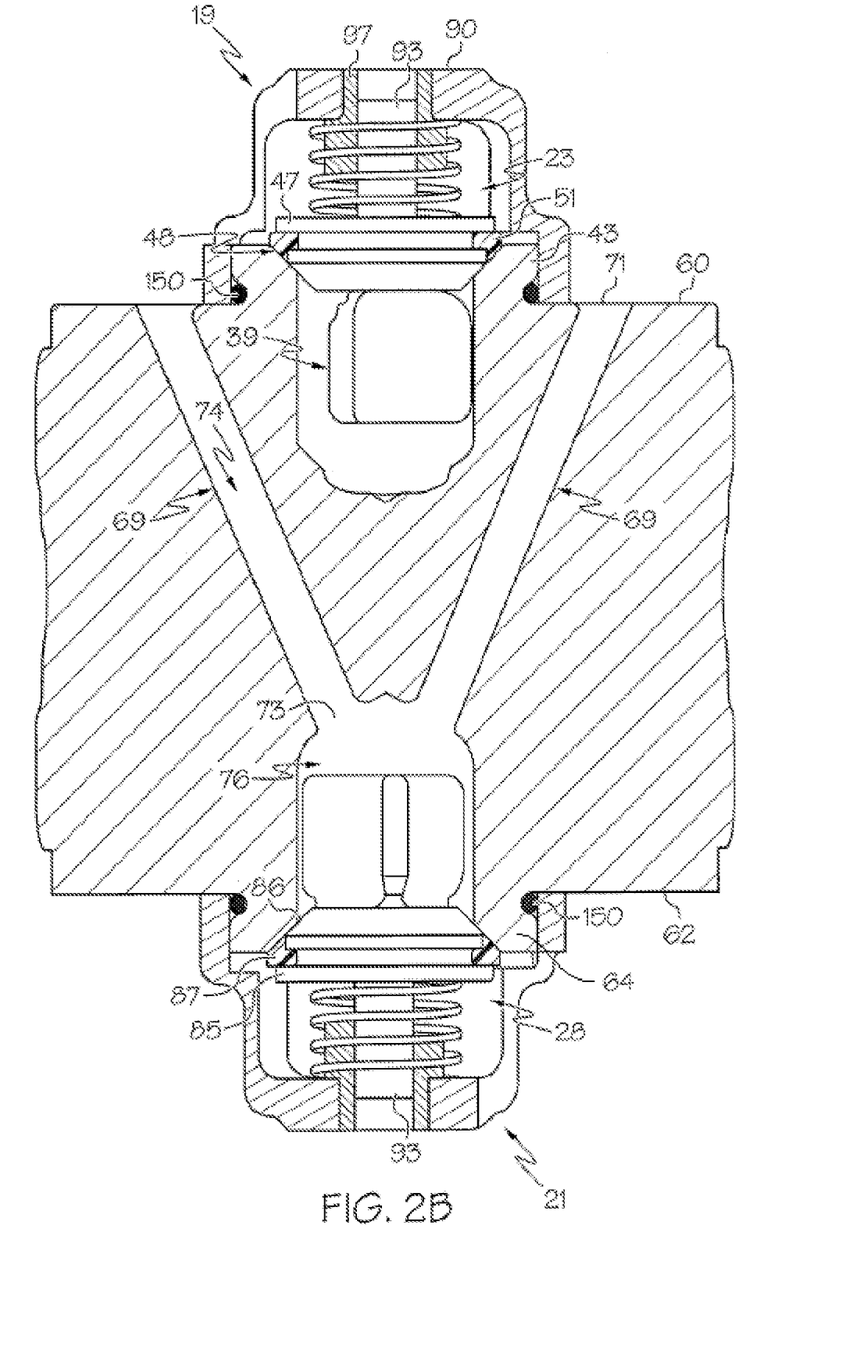
FIG. 2b is a partial sectional view of the assembly of FIG. 1 wherein the valve body and other components of the assembly have been sectioned; the section is through outlet channels in the valve body; the valve cartridge assembly has been rotated 45 degrees relative to FIG. 2a; some components, such as the suction valve, for clarity, have not been sectioned.
Figure 3B:
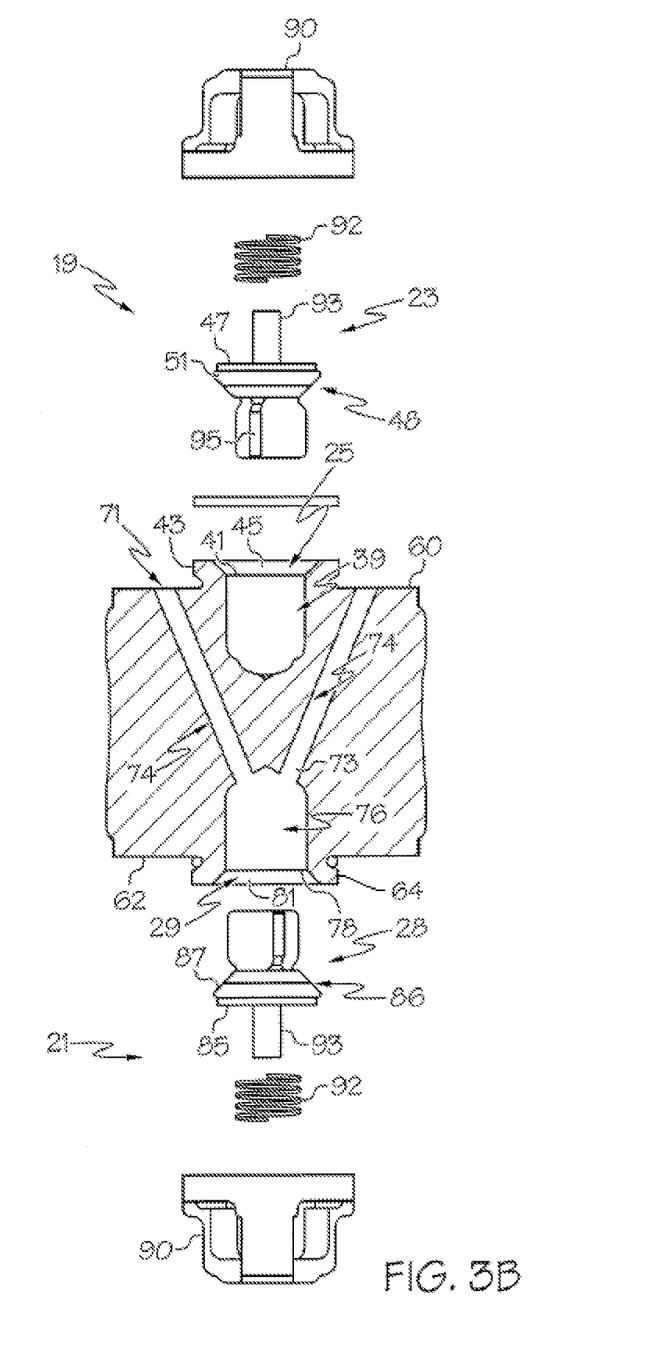

A plurality of outlet channels 69 is in different portions of the valve body 17. Each channel 69 has a respective first opening 71 and a respective second opening 73. Each channel 69 has a fluid pathway 74 extending between its respective first 71 and second 73 openings. Each first 71 opening opens into and is proximate pumping chamber 31. Each first opening 71 provides an entry into its respective pathway 74 and an entry into valve body 17 from the pumping chamber 31. The pumping chamber 31 is the area fluid is drawn into from the suction manifold 35 after it has passed through the inlet 25. Neither the suction valve 23 nor the discharge valve 28 covers the first openings 71. Each first opening 71 remains open and uncovered during operation of the pump. There are four first openings 71; each first opening 71 opens through a portion of the first surface 60. Each first opening 71 is spaced 90 degrees apart around and radially outward of the valve body axis. Each first opening 71 is also radially outward of and around the inlet 25. Each second opening 73 opens into a second main channel 76. Each second opening 73, provides an exit from its respective pathway 74 into the second main channel 76. The second main channel 76 is also in a portion of the valve body 17. It is fluidly sealed off from the first main channel 39. There are no channels in the valve body interconnecting the first main channel and the second main channel. The second main channel 76 can simply be a hollow chamber into which all second openings 73 open. Each outlet channel 69 extends radially outwardly and axially relative to the valve body 17 axis and second main channel axis and outlet axis. The outlet channels first openings 71 and outlet channels 69 are each offset 45 degrees from each adjacent inlet channel first opening and each adjacent inlet channel.

The outlet 29 is the only outlet proximate and adjacent the discharge valve 28. The outlet 29 is at a first end of the second main channel 76. The outlet 29 is delimited by a surface 78. The surface 78 circumscribes the outlet 29. The surface is continuous. The continuous surface is smooth and without any appreciable detents or bumps. The outlet 29 is delimited and circumscribed in the radial direction, relative to the axis of the outlet, by the surface 78. The continuous surface 78 intersects and lies along a continuous path wherein the path falls completely within a single plane.

The outlet 29 is delimited by discharge valve seat 64. The outlet 29 is circumscribed by the discharge valve seat 64. The outlet 29 is circumscribed and delimited in the radial direction, relative to the axis of the outlet, by the discharge valve seat 64. The outlet 29 is the only outlet delimited and/or circumscribed by the discharge valve seat 64. The continuous surface 78 forms at least part of the discharge valve seat 64. In the present embodiment the discharge valve seat 64 has a seating surface 81 which is formed at least in part by the continuous surface 78. In the present example the entire valve seating surface 81 is formed by the continuous surface 78. The valve seating surface 81 is continuous and without any through channels opening therethrough. It is without any appreciable detents or pumps therein. The outlet 29 is the only outlet delimited and/or circumscribed by the discharge valve seating surface 81. The discharge valve seat 64 is coupled to a portion of the valve body 17, integrally formed with the portion valve body 17 and seamless with the portion of the valve body 17.

The valve seating surface 81 extends from a first axial end to a second axial end. The second axial end is proximate the second main channel 76 and delimits an area of the outlet 29 that opens to the second main channel 76. The first axial end is proximate fluid chamber 83 in the discharge manifold 37. The first axial end delimits that area of the outlet 29 which opens to the fluid chamber 83. The discharge valve seat 64 is coupled to the second surface 62 and seamless with second surface 62. It extends away from the second surface 62 in the direction of the outlet 29 axis. The discharge valve seating surface 81 is angled from the first axial end towards the axis of outlet. The axis of the outlet extends through the first axial end and the second axial end. The angle of intersection relative to the axis of the outlet is greater than 0 and less than 90 degrees. The suction valve seating surface 81 is concave.

The discharge valve 28 has a valve closing member 85 with a contact surface 86. In this example the closing member 85 is a valve head. The contact surface 86 contacts the valve seating surface 81 when the discharge valve 28 is in the closed position. The contact surface 86 delimits a shape complimentary to the shape delimited by the valve seating surface 81. The contact surface 86 is continuous, smooth and without any appreciable detents or bumps. A portion 87 of the contact surface 86 which contacts valve seating surface 81 when the valve 28 is in the closed position enhances the sealing engagement between the closing member 85 and the discharge valve seat 64. The portion 87 is a different material than other portions of the contact surface 86 that contact the valve seating surface 81. The portion 87 can be a softer resilient alloy than the other contact portions. The portion 87 can be plastic or rubber. The portion 87 in the enclosed example is elastomeric. The portion 87 is a continuous surface without any appreciable bumps or detents. The elastomeric material is part of a continuous elastomeric member inlaid around a portion of the closing member. It is carried by a portion of the closing member 85.

In more detail the suction 19 and discharge 21 valve assemblies each have a cage 90. Each cage 90 supports its respect valve 23, 28 and acts as a guide for its respective valve 23, 28. The cage 90 also acts as a retainer for each assembly's respective spring 92. Each spring biases its respective valve 23, 28 in the closed position. Each spring 92 is carried by its respect valve 23, 28 and sits around each valve's respective stem 93. Each spring 92 is disposed between each valve assembly's respective cage 90 and its respective head 47, 85. Each spring 92 biases its respective valve 23, 28 in the closed position. Each valve 23, 28 is in slideable engagement with its respective cage 90. Each stem 93 is in slideable engagement with the stem guide 97 of its respective cage 90. Each cage 90 is coupled to the valve body 17. One cage 90 is coupled proximate the first surface 60. The other cage 90 is coupled proximate the second surface 62. Notably an O-ring 150 seals each cage 90 to valve body 17. Extending from each valve head 47, 85 in a direction opposite from which each stem 93 extends is a respective flow divider 95. Each flow divider 95 has partitions which form channels within each divider. When each valve 23, 28 is in its respective closed position, each flow divider 95 sits in its respective main channel 39, 76. The suction valve flow divider 95 sits in first main channel 39 when suction valve 23 is in the closed position. It is in inlet 25, at least partially, when the suction valve 23 is in the open position. The discharge valve flow divider 95 sits in the second main channel 76 when discharge valve 28 is in the closed position. It is in the outlet 29, at least partially, when the discharge valve 28 is in the open position. The suction valve 23 does not have a flow channel therethrough to allow fluid to pass into the valve body when the suction valve 23 is in the closed position.

The discharge valve assembly 21 and the suction valve assembly 19 have the same construction and their components have the same dimensional shape. Every component does not have to have the same dimension or construction. Notably the contact surface 48, 86 of each valve head 47, 85 is dimensionally the same and is the same construction. Each valve head 47, 85 is dimensionally the same and has the same construction. The valve cartridge assemblies are interchangeable with one another. All components do not have to be interchangeable with one another. Notably the valves 23, 28 are interchangeable and the cages 90 are interchangeable.

In more detail, the valve body 17 is a single unit. It is a seamless construction.

The inlet and outlet are inline and extend along a same axis; the suction valve and discharge valve are inline and extend along a same axis; the first main channel and second main channel are inline and along a same axis. The inlet, outlet, suction valve, discharge valve, first main channel, and second main channel are all inline with each other and along a same axis.

Figure 4:
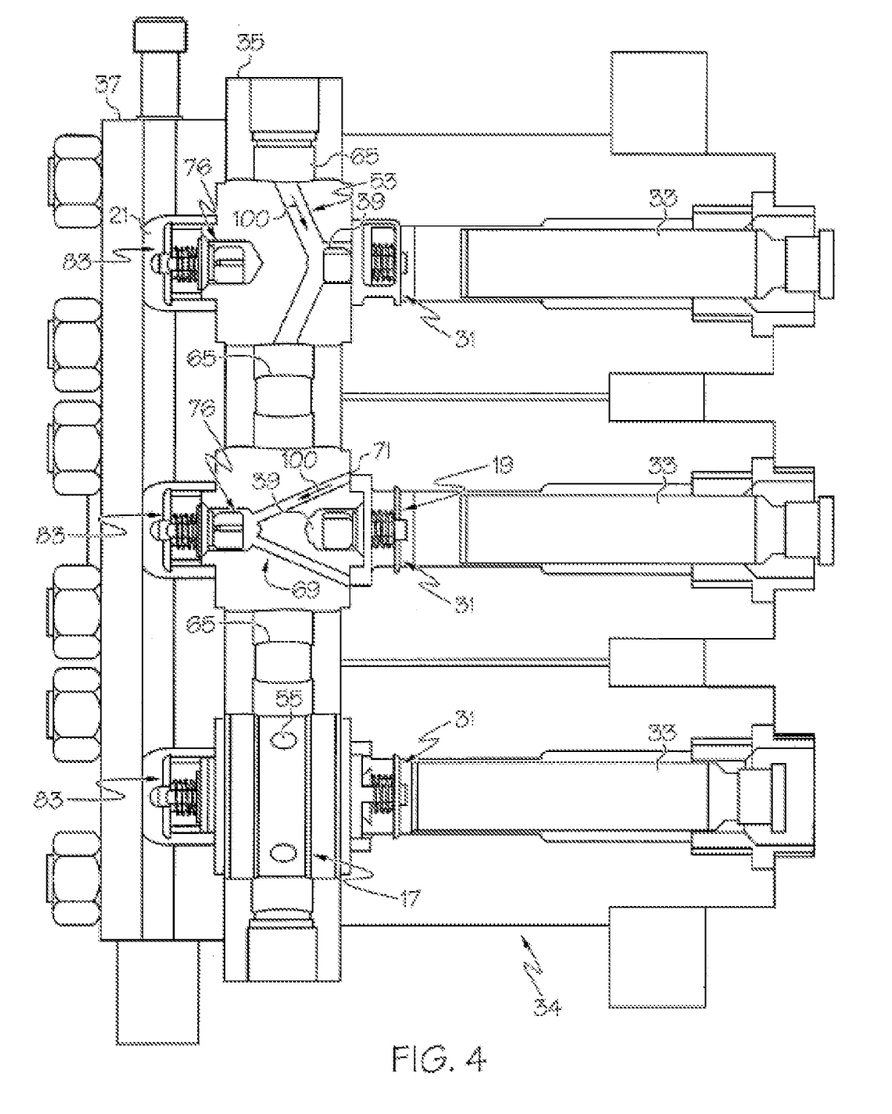
FIG. 4 is a partial sectional view of a fluid end of a pump having the valve cartridge assembly of FIG. 1 installed therein; valve cartridge assembly labeled number 1 is sectioned through inlet channels; for clarity the valve cartridge assembly labeled 2 has been rotated 45 degrees relative to cartridge number 1 and sectioned through outlet channels; valve cartridge assembly labeled 3 has been rotated 90 degrees relative to valve cartridge assembly 1 and has not been sectioned; the valves are all in the closed position.

In operation, during the upstroke of the pumping member 33 of the pump, fluid 100, in this case liquid and more particularly water, is drawn into the into the suction chamber 65 of the fluid end 34. From the suction chamber 65 the fluid is drawn into the valve body 17 through the first openings 55 of the inlet channels 53. The fluid passes into the inlet channels 53 from the first openings 55. The fluid exits the inlet channels 53 through the second openings 57 of the inlet channels 53. From the second openings 53, the fluid enters the first main channel 39. The fluid travels from first main channel 29 and through the inlet 25 past the flow divider 95 and past the valve head 47. The suction valve 23 has moved from the closed position, in which it seats on the valve seat 43 and wherein its contact surface 48 is in contact with the valve seating surface 45, to an open position. In the open position fluid can pass over the valve head 47 from the inlet 25. The valve head contact surface 48 is off of suction valve seating surface 45. From the inlet 25 the fluid passes into and collects in chamber 31. During the upstroke, the discharge valve 28 is in the closed position. In the closed position, during the upstroke, the discharge valve closing member 85 is in sealing engagement with the discharge valve seat 64. The contact surface 86 is in contact with the valve seating surface 81. The valve 28 seats on the discharge vale seat 65.

During the down stroke of the pumping member 33 of the pump, the suction valve head 47 moves to the closed position from the open position along the inlet axis. In the closed position, during the down stroke, the valve head 47 is in sealing engagement with the valve seat 43. The contact surface 48 is in contact with the valve seating surface 45. The valve 23 seats on the valve seat 43. Fluid passes from pumping chamber 31 through the first openings 71 of the outlet channels 69. The fluid passes from the outlet channels 69 through the channels' second openings 73 and into the second main channel 76. From the second main channel, the fluid travels through the outlet 29 and past the flow divider 95 and past the discharge valve head 85. The discharge valve 28 has moved from the closed position in which it seats on the discharge valve seat 64, its contact surface 86 is in contact with the valve seating surface 81, to an open position. The discharge valve 28 moves along the outlet axis to the open position. In the open position fluid can pass over the valve head 85 from the outlet 29. The valve head contact surface 86 is off of suction valve seat 65. From the outlet the fluid passes into chamber 83 of the discharge manifold 37. During the operation of the pump the pumping member 33 reciprocates between the upstroke and down stroke, the suction valve 23 reciprocates from the closed to the open position along the inlet axis and the discharge valve 28 reciprocates from the closed to the open position along the outlet axis.

From the foregoing, it will be seen that this invention is one well adapted to attain all the ends and objects hereinabove set forth together with other advantages which are obvious and which are inherent to the structure. It will be understood that certain features and sub combinations in addition to those shown and discussed herein are possible. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pump system comprising: a pump housing defining a pump bore; a pumping member disposed in the pump bore and reciprocal along a bore axis to pump a fluid; a fluid intake manifold formed as part of the pump housing and arranged to contain a quantity of fluid at a low pressure; a fluid discharge manifold formed as part of the pump housing and arranged to contain a quantity of fluid at a high pressure; and a valve assembly arranged in a fully operable condition and insertable and removable into the pump housing in the fully operable condition, the valve assembly associated with the pump bore and including: a valve body; a suction valve coupled to the valve body and movable along the bore axis between a closed position and an open position; a first cage fixedly connected to the valve body; a first spring cooperating with the first cage to bias the suction valve toward the closed position, the first spring positioned between the first cage and the suction valve such that the first cage fixedly attaches the first spring to the valve body; a discharge valve coupled to the valve body and movable along the bore axis between a closed position and an open position; a second cage fixedly connected to the valve body; and a second spring cooperating with the second cage to bias the discharge valve toward the closed position, the second spring positioned between the second cage and the discharge valve such that the second cage fixedly attaches the second spring to the valve body; and a plurality of discharge channels formed as part of the valve body and arranged to direct high pressure fluid from the pump bore to the discharge valve.

2. The pump system of claim 1, wherein the pump housing defines a plurality of pump bores, a plurality of pumping members each disposed in the respective bore and each reciprocating along separate pump axes that are parallel to one another.

3. The pump system of claim 2, further comprising a plurality of valve assemblies, each valve assembly associated with one of the plurality of pump bores.

4. A pump system comprising:
   a pump housing defining a plurality of pump bores;
   a plurality of pumping members each disposed in one of the plurality of pump bores and reciprocal to pump a fluid;
   a fluid intake manifold formed as part of the pump housing and arranged to contain a quantity of fluid at a low pressure;
   a fluid discharge manifold formed as part of the pump housing and arranged to contain a quantity of fluid at a high pressure; and
   a valve assembly arranged in a fully operable condition and insertable and removable into the pump housing in the fully operable condition, the valve assembly associated with one of the plurality of pumping members, the valve assembly including:
      a valve body defining a plurality of inlet channels, each of the inlet channels in fluid communication with the intake manifold to draw fluid directly therefrom;
      a suction valve coupled to the valve body and movable between a closed position and an open position;
      a first cage fixedly connected to the valve body;
      a first spring cooperating with the first cage to bias the suction valve toward the closed position, the first spring positioned between the first cage and the suction valve such that the first cage fixedly attaches the first spring to the valve body;
      a discharge valve coupled to the valve body and movable between a closed position and an open position;
      a second cage fixedly connected to the valve body;
      a second spring cooperating with the second cage to bias the discharge valve toward the closed position, the second spring positioned between the second cage and the discharge valve such that the second cage fixedly attaches the second spring to the valve body; and
      a plurality of discharge channels formed as part of the valve body and arranged to direct high pressure fluid from the pump bore associated with the valve assembly to the discharge valve.

5. The pump system of claim 4, wherein each of the plurality of pump bores are parallel to one another.

6. The pump system of claim 4, further comprising a plurality of valve assemblies, each valve assembly associated with one of the plurality of pump bores.

7. The pump system of claim 4, wherein each of the pumping members reciprocates along an axes, and wherein the suction valve is movable along the axis of the pumping member to which the valve assembly is associated.

8. The pump system of claim 7, wherein the discharge valve is movable along the axis of the pump bore to which the valve assembly is associated.

9. A pump system comprising:
   a pump housing defining a plurality of pump bores;
   a plurality of pumping members each disposed in one of the plurality of pump bores and reciprocal to pump a fluid;
   a fluid intake manifold formed as part of the pump housing and arranged to contain a quantity of fluid at a low pressure;
   a fluid discharge manifold formed as part of the pump housing and arranged to contain a quantity of fluid at a high pressure; and
   a plurality of valve assemblies arranged in a fully operable condition and insertable and removable into the pump housing in the fully operable condition, each of the valve assemblies associated with one of the pump bores, each of the plurality of valve assemblies including:
      a valve body;
      a suction valve coupled to the valve body and movable between a closed position and an open position;
      a first cage fixedly connected to the valve body;
      a first spring cooperating with the first cage to bias the suction valve toward the closed position, the first spring positioned between the first cage and the suction valve such that the first cage fixedly attaches the first spring to the valve body;
      a discharge valve coupled to the valve body and movable between a closed position and an open position;
      a second cage fixedly connected to the valve body; and
      a second spring cooperating with the second cage to bias the discharge valve toward the closed position, the second spring positioned between the second cage and the discharge valve such that the second cage fixedly attaches the second spring to the valve body.

10. The pump system of claim 9, wherein each of the pumping members reciprocates along one of a plurality of axes, and wherein each of the plurality of valve assemblies is associated with one of the pumping members, and wherein the suction valve of each valve assembly is movable along the axis of the pumping member to which the valve assembly is associated.

11. The pump system of claim 10, wherein the discharge valve is movable along the axis of the pumping member to which the valve assembly is associated.

12. The pump system of claim 9, wherein each of the valve bodies defines a plurality of discharge channels formed as part of the valve body and arranged to direct high pressure fluid from the pump bore associated with the valve assembly to the discharge valve.

13. The pump system of claim 9, wherein each of the valve bodies defines a plurality of inlet channels, each of the inlet channels in fluid communication with the intake manifold to draw fluid directly therefrom.

* * * * *